J. W. DILLEY.
Combined Harrow and Cultivator.

No. 167,879. Patented Sept. 21, 1875.

Witnesses:
T. J. Price
J. M. Price

Inventor:
John W. Dilley

UNITED STATES PATENT OFFICE.

JOHN W. DILLEY, OF MACOMB, ILLINOIS.

IMPROVEMENT IN COMBINED HARROWS AND CULTIVATORS.

Specification forming part of Letters Patent No. 167,879, dated September 21, 1875; application filed December 29, 1874.

*To all whom it may concern:*

Be it known that I, JOHN W. DILLEY, of Macomb, in the county of McDonough and State of Illinois, have invented a new and useful Improvement in Combined Harrow and Cultivator; and I do hereby declare that the following is a full, clear, and exact description of its construction and operation, reference being had to the accompanying drawings making a part of this specification, in which—

Figure 1:
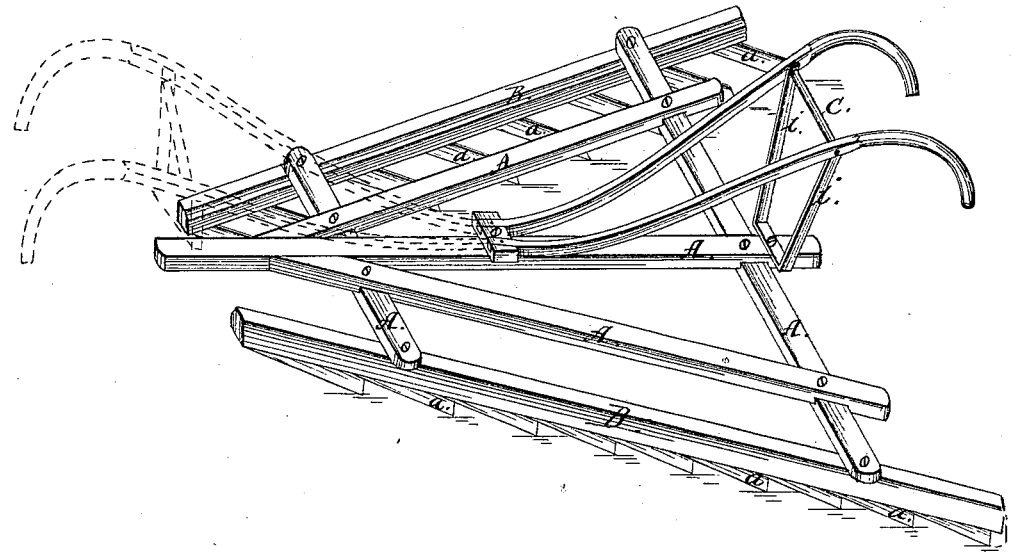
Figure 2:
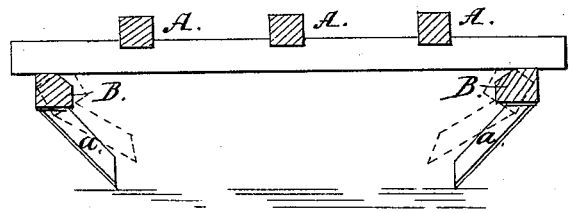
Figure 3:
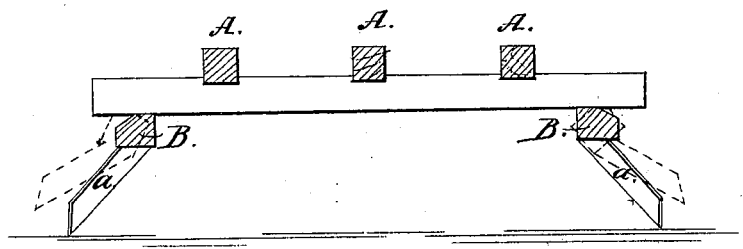
Figure 4:
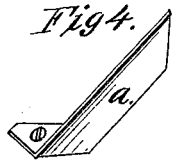

Figure 1 is a perspective view, and Figs. 2 and 3 are cross-sections of the same. Fig. 4 will be described in the general description.

The nature of my invention relates to that class of agricultural implements that is used for pulverizing and smoothing the ground, and covering small grain when sown broadcast, also cutting sod, and cultivating young corn; and its novelty consists, first, in attaching adjustable cutters to a suitable beam, which is attached to a suitable frame, provided with reversible handles; second, in the shape and form of a cutter hereinafter set forth.

In Fig. 1, A A A represent an angular frame made out of any suitable material, to which are attached beams B B. These beams have adjustable cutters *a a a* attached at equal distances on the under side. These cutters set on an angle to the rearward at forty-five degrees, and inward at about twenty-five degrees. These cutters, shown fully in Fig. 4, are adjustable, and they can be turned until the edge is on line with the draft, or to any desired angle that may be required. The cutter shown in Fig. 4 is made of thin steel. The ends are cut at an angle of forty-five degrees. The upper end is bent at an angle of forty-five degrees across the plate, and at an angle of ninety degrees with the edge. They are attached to the beams B B with bolts. The beams B B are beveled on the upper side, which forms two faces. These bevels are for the purpose of giving a greater angle inward or outward to the cutters, as the case may be, by attaching the beams on the bevel to the frame A A A, as shown in Figs. 2 and 3, as shown in dotted lines. The handles *c* are attached to a pivot-block, which is attached to the center of the center draft-beam in the frame A A. (Shown in Fig. 1.)

When this implement is used for pulverizing and smoothing the ground the cutters *a a a* are adjusted to such an angle that they will cut and cover the whole surface of the ground that it is drawn over. This same adjustment answers for covering small grain. When used for cutting sod, the cutters are turned until the edge is in the line of draft, so they will cut through the sod without turning it over.

When the implement is used for cultivating young corn, the beams B B are reversed end for end, so that the angle of the cutter will be outward. (Shown in Fig. 3.) The handles are also reversed, (shown in dotted lines,) and can be changed to either end by detaching the brace. The handles turn on the pivot-block, so that they can be used at either end of the implement, as the case may be, as seen in Fig. 1. The implement is then drawn with the broad end forward, running astride the row, cultivating both sides at once.

By reversing the beams, and changing the angle of the cutters outward, the implement can be used for cultivating corn without the least danger of cutting up or destroying the plants.

The draft is applied to the center beam at either end, as the case may be.

Having thus fully described my invention, what I claim as new, and desire to secure by Letters Patent, is—

The reversible beams B B, in combination with angular and adjustable cutters *a* and reversible handles C, as shown and described.

JOHN W. DILLEY.

Witnesses:
 THOS. J. PRICE,
 W. T. PRICE.